United States Patent
Chitsaz et al.

(10) Patent No.: US 12,425,327 B2
(45) Date of Patent: Sep. 23, 2025

(54) CONFIGURING APPLICATION AVAILABILITY USING ANYCAST ADDRESSING

(71) Applicant: Palo Alto Networks, Inc., Santa Clara, CA (US)

(72) Inventors: Jacob Rameen Chitsaz, Raleigh, NC (US); Jayant Jain, Cupertino, CA (US); Brian Russell Kean, Cincinnati, OH (US); Uttam Ramesh, Sunnyvale, CA (US); Mingfei Peng, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 59 days.

(21) Appl. No.: 18/499,121

(22) Filed: Oct. 31, 2023

(65) Prior Publication Data

US 2025/0141778 A1     May 1, 2025

(51) Int. Cl.
*H04L 45/02*     (2022.01)
*H04L 45/74*     (2022.01)
(Continued)

(52) U.S. Cl.
CPC .............. *H04L 45/02* (2013.01); *H04L 45/74* (2013.01); *H04L 61/2514* (2013.01); *H04L 61/4511* (2022.05); *H04L 61/5007* (2022.05)

(58) Field of Classification Search
CPC ..... H04L 45/02; H04L 45/74; H04L 61/2514; H04L 61/4511; H04L 61/5007; H04L 67/10; H04L 67/1001; H04L 67/1008
See application file for complete search history.

(56) References Cited

U.S. PATENT DOCUMENTS 10,412,156 B1 *    9/2019   Dickinson ............ H04L 67/1021
10,979,387 B2      4/2021   Maslak
(Continued)

OTHER PUBLICATIONS

Palo Alto Networks Inc., "Prisma Access ZTNA Connector", Tech Docs, Palo Alto Networks [online], 2023 [retrieved on Sep. 1, 2023] Retrieved from the Internet: <https://docs.paloaltonetworks.com/prisma-access/administration/ztna-connector-in-prisma-access>.

*Primary Examiner* — Johnny B Aguiar
(74) *Attorney, Agent, or Firm* — Gilliam IP PLLC

(57) ABSTRACT

Anycast addressing is utilized to support the connection of multiple application connectors fronting an application(s) to a network element and anycast routing of network traffic destined for the application(s). When an application is indicated for onboarding in a tenant's network fabric, a network controller allocates virtual and anycast addresses to the application. Allocation of anycast addresses is per domain name and port/protocol combination. Upon determining that the application is available, the application connector(s) advertises reachability of the application via the anycast address. The network controller orchestrates configuration of a domain name system entry that resolves the application name to its virtual Internet Protocol (IP) address and destination network address translation rules that translate the virtual IP address to the anycast address and the anycast address to the application's private IP address. Application network traffic can thus be forwarded to the application via any application connector that advertised the anycast address.

20 Claims, 6 Drawing Sheets

(51) Int. Cl.
*H04L 61/2514* (2022.01)
*H04L 61/4511* (2022.01)
*H04L 61/5007* (2022.01)

(56) References Cited

U.S. PATENT DOCUMENTS

| | | | |
|---|---|---|---|
| 2009/0113057 A1* | 4/2009 | Van der Merwe | H04L 45/00 709/227 |
| 2011/0153941 A1* | 6/2011 | Spatscheck | G06F 9/5083 711/119 |
| 2014/0108674 A1* | 4/2014 | Eggleston | H04L 61/5069 709/245 |
| 2017/0099346 A1* | 4/2017 | Eisenbud | H04L 67/1008 |
| 2018/0062914 A1* | 3/2018 | Boutros | H04L 69/40 |
| 2021/0105202 A1* | 4/2021 | Sriram | H04L 43/0888 |
| 2023/0040752 A1* | 2/2023 | Lubashev | H04W 4/025 |
| 2023/0300210 A1* | 9/2023 | Wang | H04L 67/146 709/203 |
| 2024/0333643 A1* | 10/2024 | Khare | H04L 45/22 |

* cited by examiner

CONFIGURING APPLICATION AVAILABILITY USING ANYCAST ADDRESSING

BACKGROUND

The disclosure generally relates to transmission of digital information (e.g., CPC class H04L) and network arrangements, protocols or services for addressing or naming (e.g., subclass H04L 61/00).

The anycast methodology allows for a single Internet Protocol (IP) address to be shared by multiple devices (e.g., multiple servers). An "anycast address" is an IP address that is shared by multiple devices in accordance with anycast addressing. Requests that designate an anycast address as a destination address can be served by any of the devices associated with the anycast address. With anycast routing, a sender selects which of a set of devices associated with the anycast address to send a request indicating the anycast address. Selection can be based on cost or distance such that the request is delivered to the individual device that is nearest to the sender and/or associated with the lowest cost.

Zero trust network access, commonly abbreviated as "ZTNA," refers to a security model for providing secure, remote access to resources of an organization (e.g., applications and services). ZTNA technologies differ from virtual private networks (VPNs) in their implementation of zero trust principles for providing users with access to resources, particularly in that users are denied access to resources by default. ZTNA also prevents exposure of private/internal information about an organization's resources, such as private IP addresses of applications.

BRIEF DESCRIPTION OF THE DRAWINGS

Embodiments of the disclosure may be better understood by referencing the accompanying drawings.

DESCRIPTION

Figure 1:
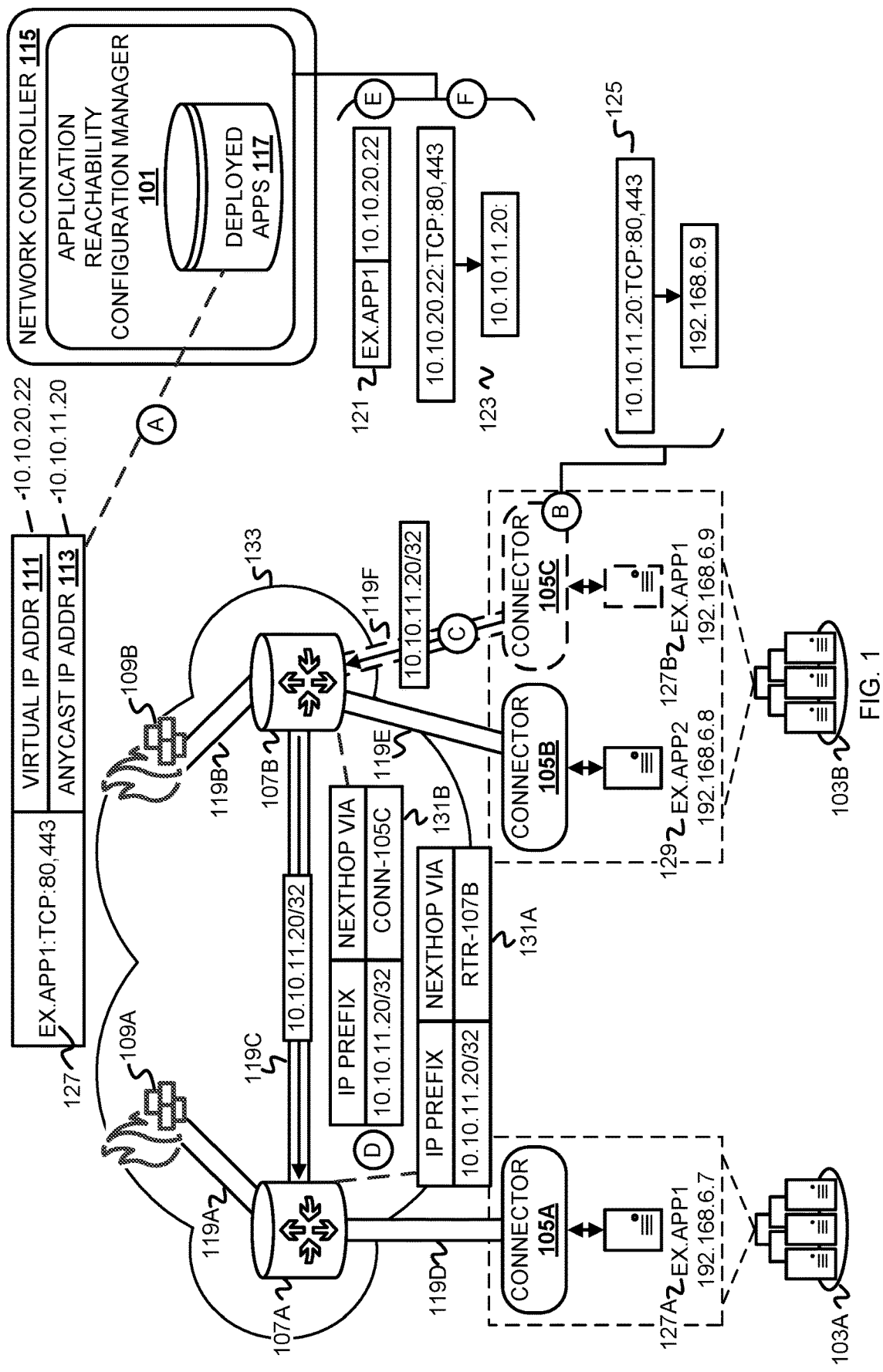
FIG. 1 depicts an example of configuring reachability of an application deployed in a tenant data center(s) via anycast routing.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider (CSP). For instance, a cloud can encompass the servers, virtual machines, and storage devices of a CSP. In more general terms, a cloud service provider resource accessible to customers is a resource owned/managed by the cloud service provider entity that is accessible via network connections. Often, the access is in accordance with an application programming interface (API) or software development kit provided by the CSP.

This description uses the term "application connector" to refer to a network element deployed in a network to front an application. The application connector "fronts" an application by providing access to an instance of the application without publicizing a network address assigned to the application instance. Fronting an application is also referred to herein as proxying or being a proxy for an application.

The description refers to a "network controller" and "controller." Both terms refer to a device programmed and configured to provide instructions/commands for network management and/or orchestrating network functions, or to a program(s) that generates instructions/commands for network management and/or orchestrating network functions when the program(s) is executed.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

When making cloud-hosted resources (e.g., applications) available via application connectors in networks utilizing ZTNA technologies, users are provided access to an application connector that fronts an application via a network element that has established a tunnel to the application connector. Typically, each of these network elements supports connectivity to one corresponding application connector. However, the one-to-one relationship between application connectors and the network elements to which they connect that are instantiated/deployed in a network can be associated with high overhead and IP address bloat.

To mitigate this, anycast addressing is utilized to support the connection of multiple application connectors fronting an application(s) to a network element and anycast routing of network traffic of the application(s) as disclosed herein. When an application is indicated for onboarding in a network fabric of a tenant (e.g., a customer), a network controller allocates a virtual IP address and an anycast IP address to the application. While different application instances may have different virtual IP addresses, allocation of anycast IP addresses is per application domain name (e.g., fully qualified domain name (FQDN)) and port/protocol combination irrespective of where the application is deployed or how many instances of the application are available in the network; in other words, each instance of an application as defined by application name, port, and protocol is allocated the same anycast IP address. Upon determining that the application is available based on a response to probing the application, the application connector(s) that fronts the application advertises reachability of the application via its anycast IP address. The network controller orchestrates configuration of a domain name system (DNS)

entry that resolves the application name to its virtual IP address and destination network address translation (NAT) rules that translate the virtual IP address to the anycast IP address allocated for the associated application and the anycast IP address to the application's private IP address. Network traffic destined for the application can thus be forwarded to the application via any application connector that advertised the application's anycast IP address.

Utilizing anycast routing for many-to-many relationships among network elements and the instantiated application connectors to which the network elements route network traffic also facilitates scaling up and down within the network fabric. When a number of application connectors having tunneled connections to a network element reaches a threshold, instantiation of a new application connector triggers deployment of a new network element with which the application connector establishes a tunnel. The newly deployed network element establishes tunneled connections with other network elements as well as other application connectors, thus creating a full mesh among network elements and application connectors. Additionally, as applications are deleted/removed from the network fabric, their anycast addresses are relinquished, and the update can be quickly communicated among network elements in the network fabric for updating of NAT and routing rules.

Example Illustrations

FIG. 1 depicts an example of configuring reachability of an application deployed in a tenant data center(s) via anycast routing. FIG. 1 depicts an application reachability configuration manager 101 (hereinafter the "configuration manager 101") and a network fabric 133. The configuration manager 101 and network elements of the network fabric 133 have various capabilities to onboard application connectors and applications for tenants and to create routes through the network fabric 133 to extend the network fabric 133 into tenant networks, which in this example includes data centers 103A-B of a tenant. The data centers 103A-B may be in different geographic regions. The configuration manager 101 executes as part of a network controller 115 (e.g., a cloud-based network controller, a software-defined wide area network (SD-WAN) controller, etc.) that can communicate with network elements of the network fabric 133. In this example, the network fabric 133 includes secure gateways 109A-B and routers 107A-B, each of which is programmed with load balancing functionality. The secure gateways 109A-B manage access of users to tenant resources through enforcement of security policies. The secure gateways 109A-B can comprise firewalls or secure web gateways, for example. Users of the tenant can connect to one of the secure gateways 109A-B to access tenant resources. The routers 107A-B can be configured to serve different regional data centers. For instance, the router 107A may serve network traffic of the data center 103A, and the router 107B may serve network traffic of the data center 103B. A tunnel 119A is established between the secure gateway 109A and the router 107A, and a tunnel 119B is established between the secure gateway 109B and the router 107B. The routers 107A, 107B are connected via a tunnel 119C. The tunnels 119A-C may be Internet Protocol security (IPsec) tunnels, for example.

FIG. 1 depicts an application connector 105A deployed in the data center 103A and an application connector 105B deployed in the data center 103B. The illustration suggests that the application connectors 105A-B are software, but application connectors can be hardware. The router 107A and application connector 105A and the router 107B and application connector 105B have established therebetween a tunnel 119D and a tunnel 119E (e.g., IPsec tunnels), respectively. Multiple application connectors can be deployed to a same data center to front an application(s) to accommodate high network traffic, such as if a data center hosts a frequently used application, if the tenant has a large number of users accessing internal resources, etc. The data center 103A hosts an instance of an application 127, depicted as application instance 127A, which has a domain name "ex.app1" and private IP address 192.168.6.7. The data center 103B hosts an instance of an application 129 with a domain name "ex.app2" and private IP address 192.168.6.8.

The configuration manager 101 maintains deployed application data 117 that indicate applications deployed by the tenant and the corresponding virtual and anycast IP addresses that are allocated thereto. Applications reflected in the deployed application data 117 are defined according to their domain name (e.g., FQDN), protocol, and port number(s). While depicted as a database in FIG. 1, the deployed application data 117 may be stored in a data structure(s). This example assumes the application 127 has been defined as having the domain name "example.app1" and using Transmission Control Protocol (TCP) and ports 80 and 443.

FIG. 1 is annotated with a series of letters A-F. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the configuration manager 101 detects deployment of an application instance and allocates IP addresses to the application instance. This example assumes that the tenant is deploying a second instance of the application 127, depicted as application instance 127B, in the data center 103B. Deployment of the application instance 127B may be detected based on the tenant (e.g., a network administrator of the tenant organization) submitting a deployment request indicating the domain name, protocol, and port numbers that is received by the configuration manager 101. The deployment request can also indicate that a new application connector should be instantiated to front the application instance 127B, which results in the network controller 115 orchestrating instantiation of an application connector 105C in the data center 103B, which establishes a tunnel 119F with the router 107B. The application instance 127B has an example private IP address of 192.168.6.9. This example assumes that the configuration manager 101 has previously allocated a virtual IP address 111, the IP address 10.10.20.22, to the application named "ex.app1" from a pool of routable addresses of the tenant (e.g., an address aggregate). Allocation of virtual IP addresses by the configuration manager 101 may be per domain name such that applications sharing a domain name have assigned a same virtual IP address. The configuration manager 101 can maintain associations of domain names and virtual IP addresses allocated thereto (e.g., in a data structure). The configuration manager 101 has also updated those of the deployed application data 117 maintained for the application 127 to indicate the virtual IP address 111, or 10.10.20.22.

The configuration manager 101 also has allocated an anycast IP address 113 that is shared across instances of the application 127. Allocation of anycast IP addresses is per domain name, port, and protocol such that instances of applications that share a domain name but have different associated ports and protocols will have different anycast IP addresses allocated thereto. The anycast IP address 113 has also been allocated from a pool of routable addresses of the tenant (e.g., another address aggregate) and may differ from that used for allocation of virtual IP addresses. Since this example assumed the first instance of the application 127, the application instance 127A, was already deployed in the data center 103A, the anycast IP address 113 is already allocated to instances of the application 127 at the time of deployment of the application instance 127B. The configuration manager 101 can search the deployed application data 117 with the domain name, protocol, and port numbers designated for the application instance 127B to determine that the anycast IP address 113, which is 10.10.11.20 in this example, is allocated thereto.

At stage B, the application connector 105C configures a destination network address translation (NAT) rule to translate the anycast IP address to the private IP address of the application based on detecting availability of the application instance 127B. The application connector 105C periodically probes the application instance 127B with its IP address to determine if the application instance 127B is online and available to respond to requests. The application connector 105C can determine the private IP address of the application instances 127B through DNS resolution of the domain name in the data center 103B. The application connector 105C obtained the application instance 127B port numbers and protocol as part of its configuration for fronting the application instance 127B. The application connector 105C can probe the application instance 127B with its private IP address (determined from DNS resolution of the domain name), port numbers (i.e., 80 and/or 443), and protocol via a ping (e.g., an Internet Control Message Protocol (ICMP) echo request) or initiation of a TCP 3-way handshake. Upon obtaining a response to a probe indicating that the application is online and available, the application connector 105C configures a destination NAT rule 125 that translates the anycast IP address 113, when identified in TCP traffic destined for either of ports 80 and 443, to the private IP address 192.168.6.9 of the application instance 127B. Network traffic destined for the anycast IP address 113 can thus be forwarded to the application via its private IP address after reaching the application connector 105C, and the private IP address of the application instance 127B is not exposed outside of the data center 103B (i.e., to external networks). The configuration manager 101 can configure application connectors, including the application connector 105C, to configure destination NAT rules by sending instructions/commands thereto when the connectors are instantiated or when applications are deployed.

At stage C, the application connector 105C advertises reachability of the application via the allocated anycast IP address 113. Advertising reachability of applications can be via Border Gateway Protocol (BGP) route advertisements that indicate a route to anycast IP addresses via the advertising application connector. With respect to this example, the application connector 105C advertises a route to the anycast IP address 113 via a BGP route advertisement. This example assumes that the application connector 105B and router 107B as well as the routers 107A-B have been configured as BGP peers. The BGP route advertisement can indicate a route to an IP prefix corresponding to the anycast IP address 113, such as a/32 IP prefix (i.e., 10.10.11.20/32), via the application connector 105C. The router 107B in turn advertises the route to the anycast IP address 113 via the application connector 105C to its BGP peers, which include the router 107A. The route advertisement can indicate an identifier or network address of the application connector 105C as the route next hop for the route to the anycast IP address 113.

At stage D, the routers 107A-B update their respective routing tables with routes to the application instance 127B via the anycast IP address 113. The routers 107A-B update their routing tables with a route to the anycast IP address 113, represented with its IP prefix indicated in the BGP route advertisement, via the respective next hop for the route. In particular, the router 107A updates its routing table 131A with a route to the/32 prefix of the anycast IP address 113 and an indication of the router 107B, depicted as "RTR-107B" for simplicity, as a next hop for the route. The router 107B updates its routing table 131B with a route to the/32 prefix of the anycast IP address 113 and an indication of the application connector 105C as a next hop for the route.

While not depicted in FIG. 1 for simplicity, the routing table 131A should already comprise a route to 10.10.11.20/32 that has the application connector 105A as a next hop for the route that was installed as part of prior deployment of the application instance 127A in the data center 103A. Similarly, the routing table 131B should already indicate a route to 10.10.11.20/32 that has the router 107A as a next hop for the route. However, for the router 107A, the route to 10.10.11.20/32 that has the application connector 105A as the next hop is a lower cost route; similarly, for the router 107B, the route to 10.10.11.20/32 that has the application connector 105C as the next hop is a lower cost route. Route selection can thus be performed based on the associated costs of the possible routes.

At stage E, the configuration manager 101 configures a DNS entry 121 to resolve the domain name of the application to the virtual IP address of the application instance 127B. The DNS entry 121 resolves the domain name of the application instance 127B, or "ex.app1," to the virtual IP address 111, or 10.10.20.22. The secure gateways 109A-B may comprise DNS proxy capabilities such that the DNS entry 121 is later leveraged to resolve the application 127 domain name to the virtual IP address 111 on receipt of DNS requests by the secure gateways 109A-B. The DNS entry 121 that resolves the domain name "ex.app1" to the virtual IP address 111 may have been previously configured at the time of deployment of the application instance 127A.

At stage F, the configuration manager 101 orchestrates configuration of a destination NAT rule 123 to translate the virtual IP address 10.10.20.22 of the application 127 to the anycast IP address 113. The destination NAT rule 123 is configured such that network traffic that matches the virtual IP address 10.10.20.22 and port numbers 80 or 443 and is sent in accordance with TCP triggers the NAT of the destination address. The configuration manager 101 can orchestrate configuration of the destination NAT rule 123 for the secure gateways 109A-B so that incoming network traffic that resolves to the virtual IP address of the application instance 127B is forwarded towards the anycast IP address 113 and can thus be forwarded to any one of the deployed instances of the application 127. The configuration of the destination NAT rule 123 can be based on the configuration manager 101 communicating an instruction/command to the secure gateways 109A-B. Once the application instance 127B has been deployed and had reachability configured via anycast routing, network traffic that the secure gateways 109A-B identify to include the domain name "ex.app1" can be routed to any instance of the application 127 via the anycast IP address, such as according to the lowest cost path to the anycast IP address.

Figure 2:
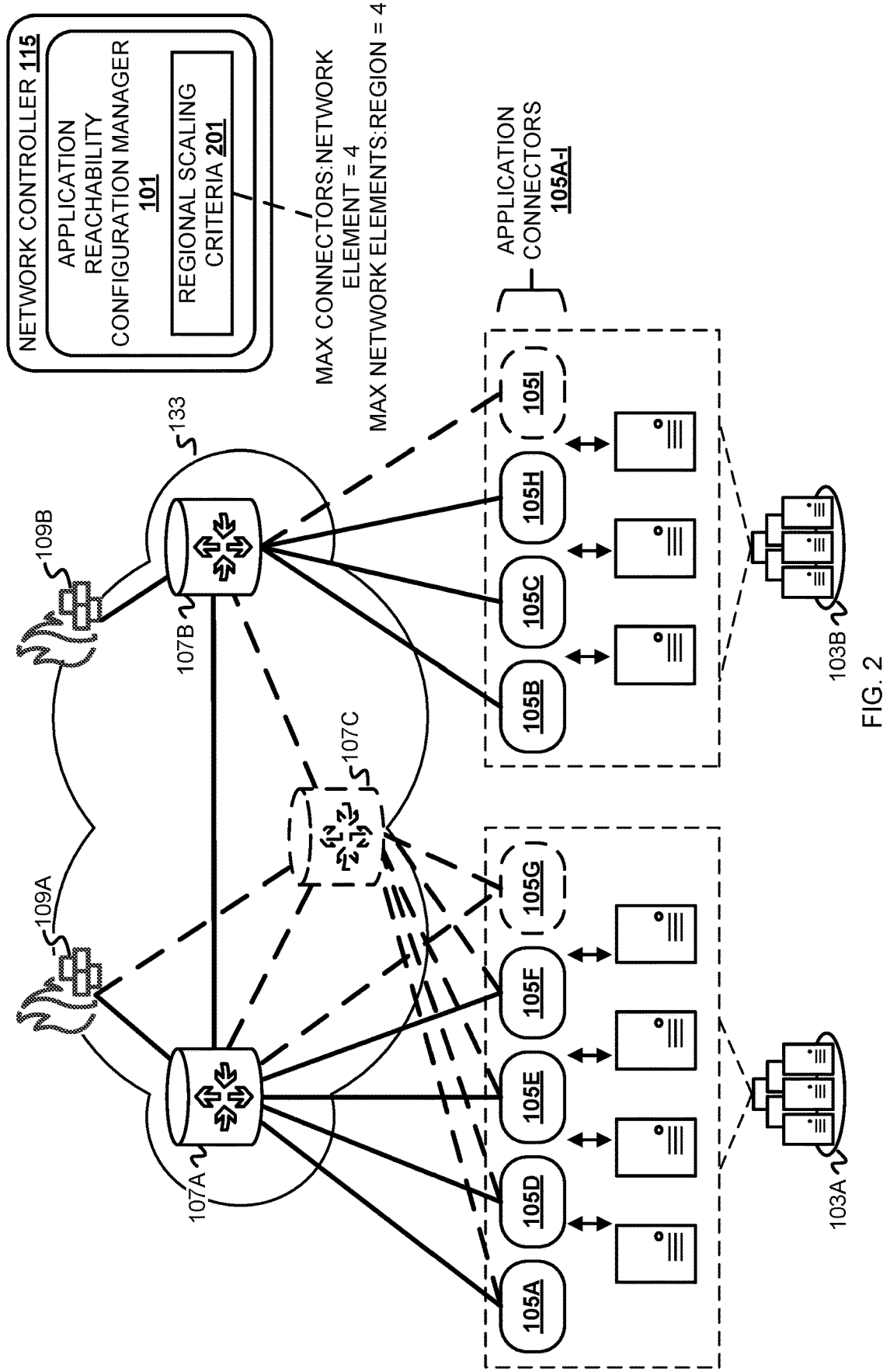
FIG. 2 is a conceptual diagram of managing scaling of application connectors and network elements in networks where anycast addressing-based reachability of applications has been configured.

FIG. 2 is a conceptual diagram of managing scaling of application connectors and network elements in networks where anycast addressing-based reachability of applications has been configured. The configuration manager 101 maintains regional scaling criteria ("criteria") 201 that indicate criteria for scaling application connectors in a region and for scaling network elements (e.g., routers) in a region. Application connectors may be added in a data center of a region that accommodates high volumes of network traffic to increase bandwidth, such as in cases where a data center hosts a frequently used application and/or serves a high volume of users. This example depicts the criteria 201 as comprising a first criterion indicating a maximum number of application connectors per network element in a region. This first criterion has a value of four and is configured as a ratio. In other words, the criteria 201 dictate that a ratio of the number of application connectors in a region to the number of network elements to which application connectors of the region connect is not to exceed four. The criteria 201 also include a second criterion indicating a maximum number of network elements per region, which has a value of four. When taken together, the criteria 201 permit a maximum of 16 application connectors in a region that each connect to four network elements in a full mesh within the region. The values of the criteria 201 may be preconfigured.

FIG. 2 depicts the secure gateways 109A-B, routers 107A-B, and application connectors 105A-C of FIG. 1 and the various tunnels established among the application connectors 105A-C as described above. This example assumes that the data center 103A has application connectors 105A, 105D, 105E, and 105F deployed thereto, with each of the application connectors connected to the router 107A via a tunnel as described in reference to FIG. 1. This example also assumes that the data center 103B has application connectors 105B, 105C, and 105H deployed thereto, with each of these application connectors connected to the router 107B via a tunnel. To aid in illustration, existing tunnels are depicted with solid lines and newly instantiated tunnels are depicted with dashed lines.

FIG. 2 depicts an example in which enforcement of the criteria 201 results in deployment of an additional network element that serves a regional data center. The configuration manager 101 detects a request to deploy an additional application connector in the data center 103A to front one or more applications hosted therein. For instance, the configuration manager 101 may receive a request from input that indicates the data center 103A as a target for instantiation of a new application connector and one or more applications of the data center 103A which are to be fronted by the new application connector. The configuration manager 101 evaluates the number of application connectors and network elements currently serving the data center 103A based on the criteria 201 and determines that the current ratio of application connectors to network elements is four and deployment of an additional application connector thus will exceed the ratio. Numbers of network elements and application connectors deployed per data center may be indicated in configuration data that the configuration manager 101 maintains and updates. The configuration manager 101 also determines that the number of network elements serving the data center 103A is not yet at the maximum of four indicated in the criteria 201 and thus orchestrates deployment of a new router 107C and an application connector 105G.

The router 107C establishes tunnels to the secure gateway 109A, which is assumed to be designated as the secure gateway for the region corresponding to the data center 103A, and to each of the routers 107A-B to provide full mesh connectivity among routers in the network fabric 133. Application connectors of the data center 103A, or the application connectors 105A, 105D-G, then establish tunnels with the new router 107C; the application connector 105G also establishes a tunnel with the router 107A. Applications of the data center 103C can thus be accessed via the router 107A or router 107C. Both the secure gateway 109A and routers 107A, 107C can load balance requests destined for applications of the data center 103A (e.g., via equal cost multi-path (ECMP) routing) due to reachability of these applications via their anycast IP addresses through either the router 107A or the router 107C. For instance, the secure gateway 109A can load balance requests across the routers 107A, 107C, and each of the routers 107A, 107C can load balance requests across the application connectors 105A, 105D-G of the data center 103A based on ECMP routing or another strategy for load balancing.

FIG. 2 also depicts an example in which enforcement of the criteria 201 results in deployment of an additional application connector that connects to an existing network element serving a region. The configuration manager 101 detects a request to deploy an additional application connector in the data center 103B. The configuration manager 101 evaluates the number of application connectors and network elements currently serving the data center 103B based on the criteria 201 and determines that the current ratio of application connectors to network elements is less than four (i.e., 3:1) and orchestrates deployment of an application connector 105I in the data center 103B. The application connector 105I establishes a tunnel to the router 107B. Deployment of additional application connectors to the data center 103B will trigger deployment of a new network element to serve the data center 103B in order to satisfy the criteria 201 as described above.

While not depicted in FIG. 1 or FIG. 2, the configuration manager 101 can configure redundancy of network elements by which users access applications within or between regional data centers. For intra-region redundancy, each active network element serving a region has a corresponding standby network element that is brought online in the event that the active network element becomes unavailable. Advertisement of anycast IP addresses and path selection through load balancing occurs similar to as described above since the active and standby network element both are associated with the same cost. For inter-region redundancy, an active network element that serves a first region can have a standby network element available in a second region that is most proximate to the first region in the event of a regional outage. The second region can be chosen by a CSP that offers cloud infrastructure of the network fabric 133 and/or tenant network(s) based on proximity. Because the path between the application connector(s) of the region and the secure gateway(s) of the region has at least one additional hop when the standby network element is traversed instead of the active network element, the standby path has a higher associated cost. The standby network element will still receive route advertisements of anycast IP addresses and install the routes but with the higher associated cost, so this route is available but unused during normal (i.e., non-failover) operations that employ ECMP.

Figure 3:
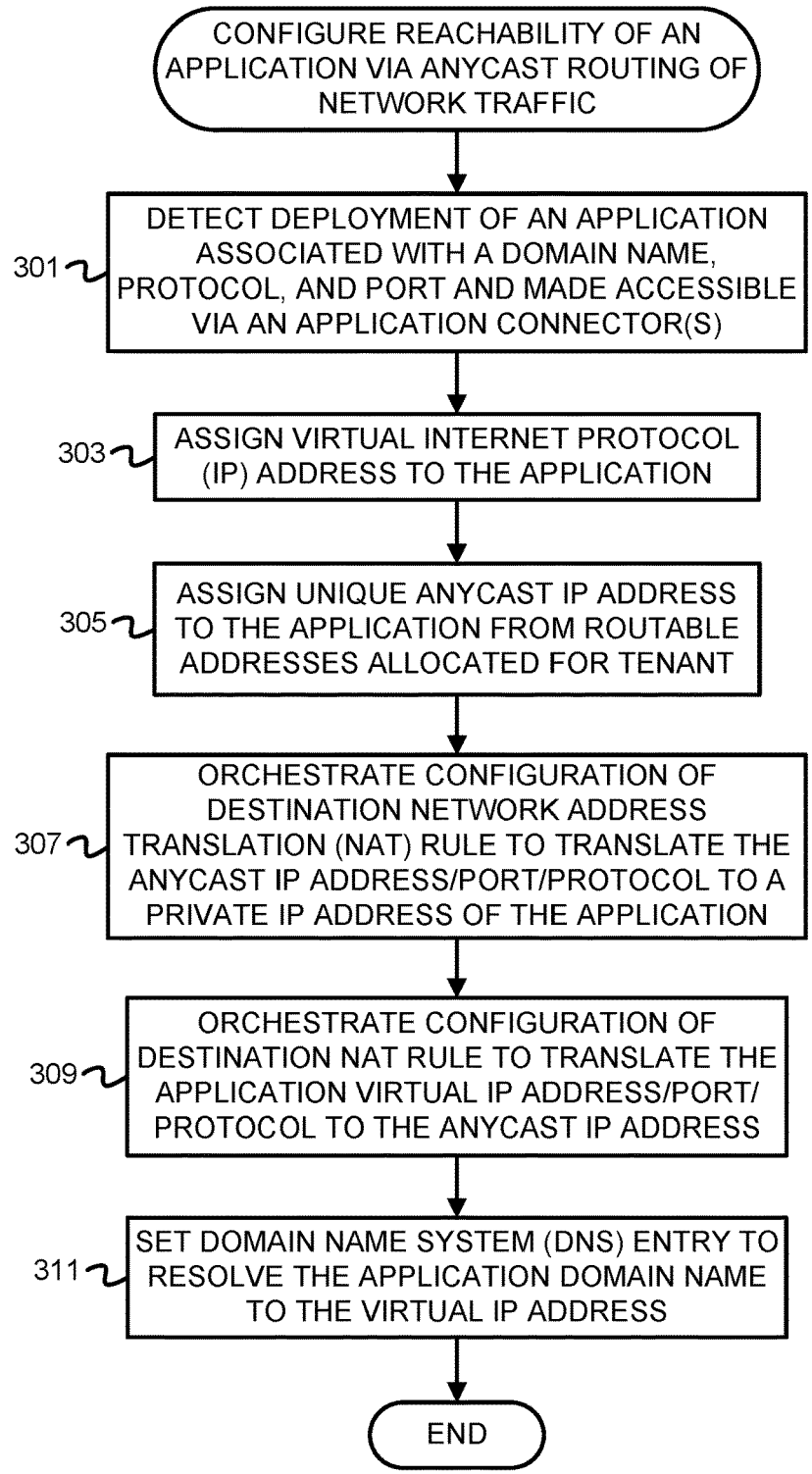
FIG. 3 is a flowchart of example operations for configuring reachability of an application via anycast routing of network traffic.
Figure 4:
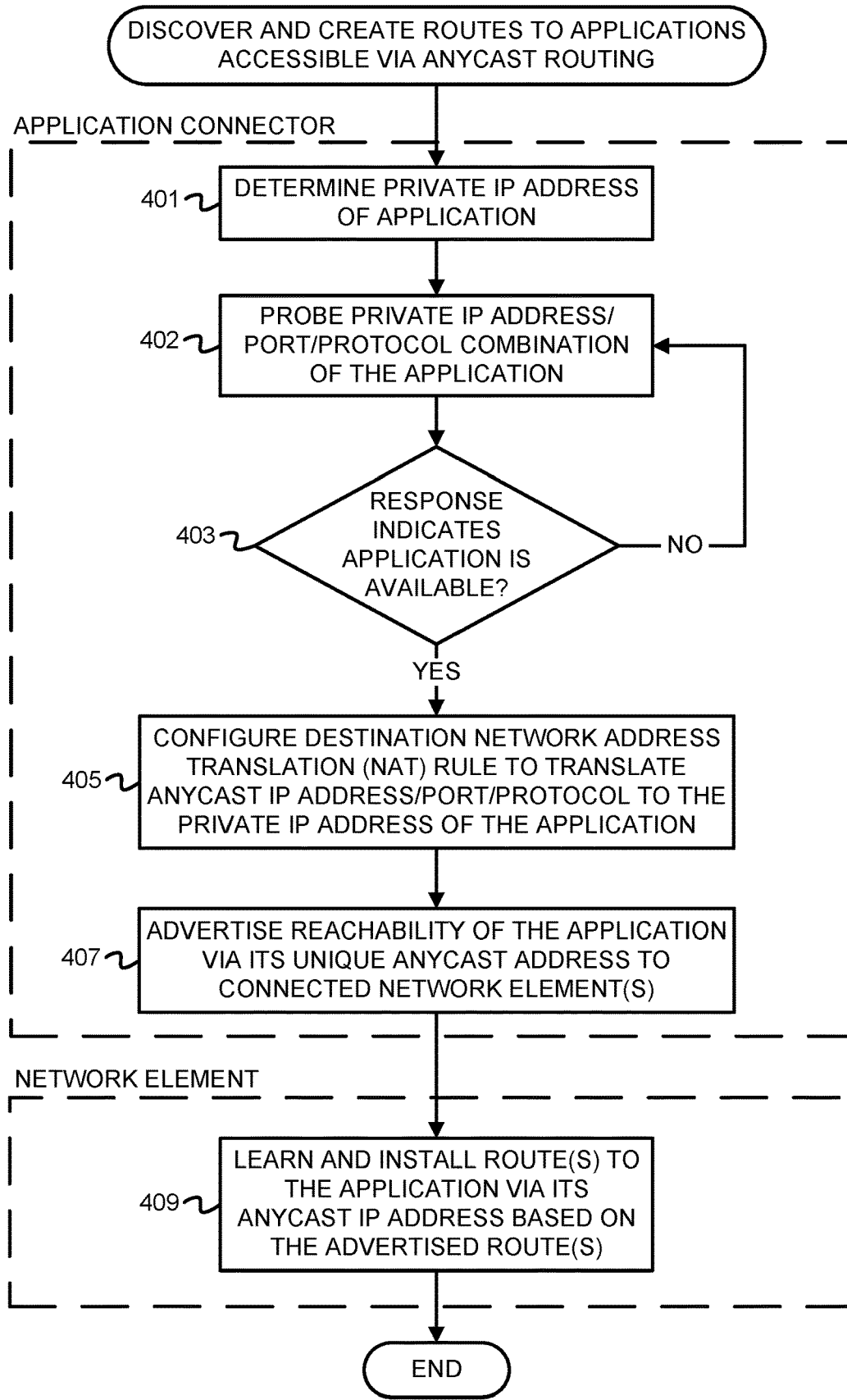
FIG. 4 is a flowchart of example operations for discovering and creating routes to applications that are accessible via anycast routing.
Figure 5:
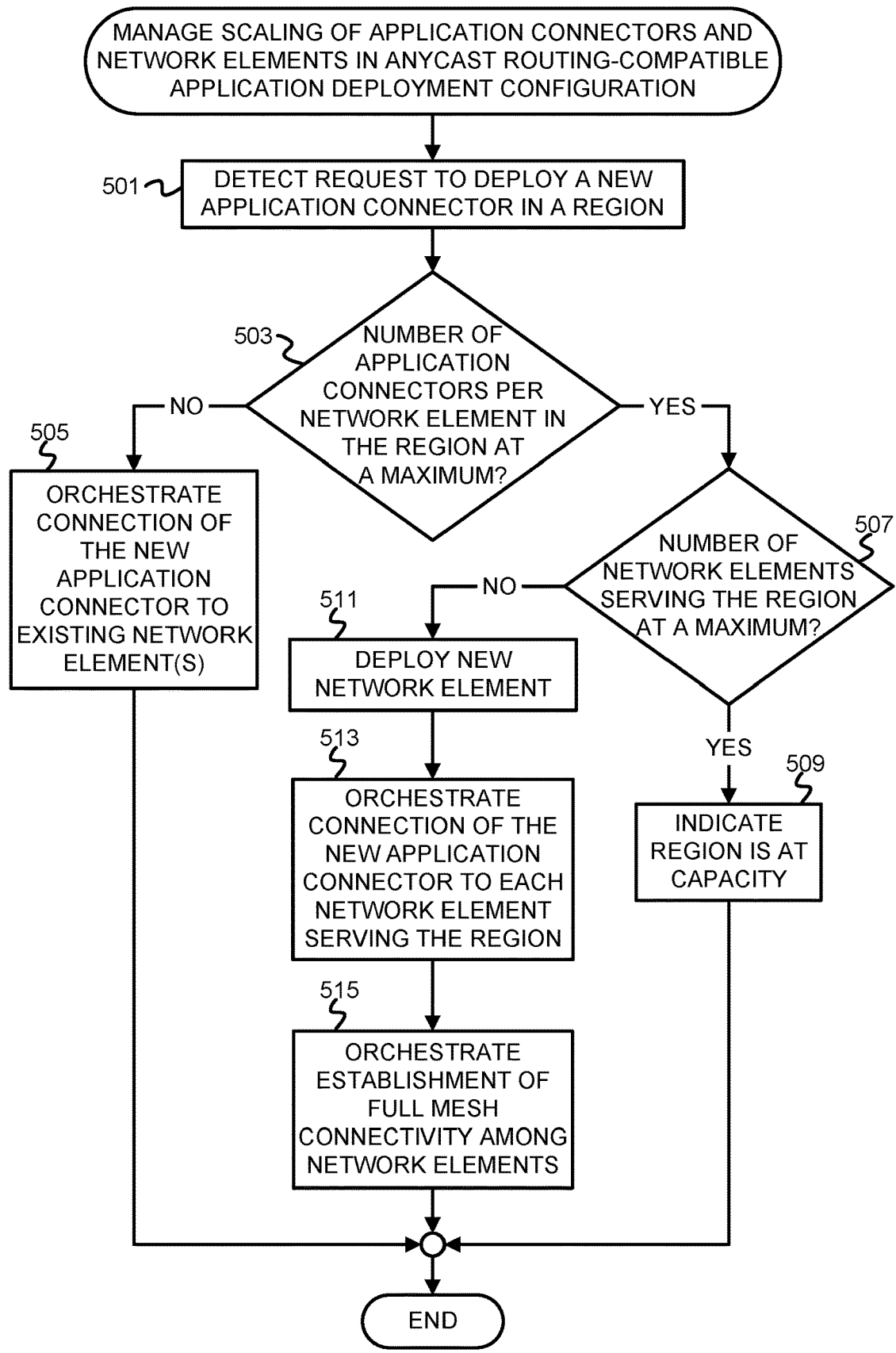
FIG. 5 is a flowchart of example operations for managing scaling of application connectors and network elements in anycast routing-compatible application deployment configurations.

FIGS. 3-5 are flowcharts of example operations. The example operations are described with reference to an application deployment configuration manager (hereinafter "the configuration manager" for brevity), an application connector, and a network element for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for configuring reachability of an application via anycast routing of network traffic. The example operations assume that a tenant has at least one data center for which an application is to be deployed and made accessible via a network fabric. The example operations also assume that the network fabric comprises at least a first network router and a first secure gateway network device that facilitates secure connection of users to resources of the tenant, such as a firewall and/or secure web gateway. The example operations are described with reference to the configuration manager.

At block 301, the configuration manager detects deployment of an application that is associated with a domain name, a protocol, and a port that is being made accessible via an application connector(s). The configuration manager receives a configuration of the application that indicates the domain name (e.g., the application FQDN), protocol, and port as well as the application connector(s) that will front the application. The configuration may indicate multiple application connectors.

At block 303, the configuration manager assigns a virtual IP address to the application. The configuration manager assigns the virtual IP address from routable address space of the tenant. Assignment of virtual IP addresses can be per domain name such that each domain name is resolved to a unique virtual IP address (even if the corresponding application instances use different port numbers and/or protocols). The configuration manager assigns the virtual IP address to the application and stores an association between the application domain name and the virtual IP address. The configuration manager can first search maintained associations between domain names and virtual IP addresses with the application's domain name to determine whether a virtual IP address has already been assigned for the domain name and, if not, assign the domain name as described.

At block 305, the configuration manager assigns a unique anycast IP address to the application from routable addresses allocated for the tenant. The anycast IP address is shared across instances of the application. The configuration manager assigns the anycast IP address from a pool of addresses allocated to the tenant (e.g., an address aggregate) that corresponds to routable address space of the tenant's network(s). The configuration manager communicates the anycast IP address to the application connector(s) that have been configured to front the application. The configuration manager can also store an association between the application domain name, port, and protocol combination and the anycast IP address (e.g., in a data structure).

At block 307, the configuration manager orchestrates configuration of a destination NAT rule to translate the anycast IP address, port, and protocol combination to a private IP address of the application. The configuration manager can communicate a command/instruction to the application connector(s) to configure the destination NAT rule.

At block 309, the configuration manager orchestrates configuration of a destination NAT rule to translate the application's virtual IP address, port, and protocol combination to the anycast IP address. The configuration manager can communicate a command/instruction to the gateway network device(s) to configure the destination NAT rule.

At block 311, the configuration manager sets a DNS entry to resolve the application domain name to the virtual IP address. The configuration manager can communicate with one or more DNS proxies to set the DNS entry.

The example operations of FIG. 3 assume that the application deployment is part of initial onboarding of an application for the tenant. In implementations, additional instances of the application can be deployed after the initial onboarding and deployment of the application. As part of configuring application reachability via anycast routing, the configuration manager can thus query maintained domain name/port/protocol and anycast IP address associations with the application's domain name, port, and protocol to retrieve an already-assigned anycast IP address of the application instead of assigning an anycast IP address at block 305.

FIG. 4 is a flowchart of example operations for discovering and creating routes to applications that are accessible via anycast routing. The example operations are described with reference to an application connector and a network element. Multiple application connectors can front a single instance of an application, and an application connector may be accessible via multiple network elements (e.g., based on having multiple tunneled connections to multiple respective network elements). The example operations depicted at blocks 401, 403, 405, and 407 can thus be performed at least partially in parallel or concurrently for each application connector that has been configured to front an application. Similarly, the example operations depicted at block 409 can thus be performed at least partially in parallel or concurrently for each network element that learns of a route to the application via a respective application connector.

At block 401, the application connector determines a private IP address of the application. The application connector determines the private IP address via DNS resolution of the domain name of the application, where DNS resolution resolves the domain name to the private IP address. The application connector obtained the application's domain name as part of the configuration of the application connector to front the deployed application.

At block 402, the application connector probes the private IP address, port, and protocol combination of the application. Probing of deployed applications serves to ensure that applications are available and responsive before routes are created to allow network traffic to be sent to the application. The application connector probes the private IP address and port number(s) according to the protocol of the application. The application connector obtained the application's port number(s) and protocol as part of the configuration of the application connector to front the deployed application. Probing can be intermittent, such as at fixed time increments. A probing policy according to which the application connector probes the application may have been configured at the time of application deployment (e.g., by a network administrator). The probe can be an ICMP echo request or a TCP synchronize (SYN) message that should elicit a corresponding reply if the application is available.

At block 403, the application connector determines if a response to the probe indicates that the application is available. The application connector can determine that a response indicates that the application is available (i.e., able to receive and respond to requests) if a response is received at all or if a response indicates that the application has begun listening for incoming connections on the port. For instance, the application connector can determine the application is available if an ICMP echo reply is received or if a TCP 3-way handshake is completed. If the response indicates that the application is available, operations continue at block 405. Otherwise, operations return to block 401.

At block 405, the application connector configures a destination NAT rule to translate the anycast IP address, port, and protocol of the application to the private IP address of the application. The anycast IP address of the application was communicated to the application connector when the configuration manager assigned the anycast IP address to the application.

At block 407, the application connector advertises reachability of the application via the anycast IP address to one or more connected network elements. The connected network element(s) is/are those with which a tunnel (e.g., an IPsec tunnel) has been established. The application connector can advertise reachability of the application through a BGP route advertisement that indicates the anycast IP address. In this case, the application connector and network element(s) with which the application connector has established a tunnel have been established as BGP peers. The route advertisement may indicate an IP prefix corresponding to the anycast IP address (e.g., a/32 IP prefix).

At block 409, the network element learns and installs a route to the application via its anycast IP address based on the route advertised by the application connector. The network element receives the route advertised by the application connector(s) and, for each application connector, updates its routing table with a route to the anycast IP address that indicates the application connector as a next hop (e.g., via a network address, identifier, etc. of the application connector). Network traffic destined for the application that has had its destination IP address translated to the anycast IP address can thus be forwarded to any application connector that fronts the application based on a load balancing algorithm being implemented by the network elements (e.g., via ECMP) and/or based on whether an active or standby path is in use.

FIG. 5 is a flowchart of example operations for managing scaling of application connectors and network elements in anycast routing-compatible application deployment configurations. As used in the example operations, a "region" refers to a regional data center.

At block 501, the configuration manager detects a request to deploy a new application connector in a region. Deployment of a new application connector can accompany deployment of an application instance to the region. The configuration manager detects the request for deployment by receiving a notification, update, etc. indicating an attempt to deploy the application connector in a designated region.

At block 503, the configuration manager determines if the number of application connectors per network element in the region is at a maximum. The configuration manager has been configured with a criterion indicating a maximum number of application connectors that can be connected per network element via respective tunnels. The criterion can be represented as a ratio of application connectors to network elements serving the region. As an example, the configuration manager may enforce a ratio of four application connectors per network element. The configuration manager evaluates the configuration of the region for deployed application connectors based on this criterion to determine if the load on network elements serving the region's application connectors is at a maximum (e.g., meets the ratio). If the number of application connectors per network element in the region is not at a maximum, operations continue at block 505. If the number of number of application connectors per network element in the region is at a maximum, operations continue at block 507.

At block 505, the configuration manager orchestrates connection of the new application connector to the existing network element(s). Deployment of the application connector can be based on communication with a service provider of a cloud environment to which the region corresponds (e.g., via an API of the CSP) to instantiate/deploy a new resource. The application connector establishes a tunneled connection with each network element in the region. Once deployed and connected to the network element(s), the application connector can then continue with application discovery and route advertisement as described above in reference to FIG. 4.

At block 507, the configuration manager determines if the number of network elements serving the region is at a maximum. The configuration manager has also been configured with a criterion indicating the maximum number of network elements that are permitted to serve a region so that performance is not sacrificed due to a high overhead. The configuration manager determines how many network elements serve the region based on having tunneled connections to application connectors of the region (e.g., based on configurations of application connectors and/or network elements that have been deployed in the region). If the number of network elements that are connected to network elements in the region is at a maximum, operations continue at block 509. Otherwise, operations continue at block 511.

At block 509, the configuration manager indicates that the region is at capacity. The configuration manager can generate a notification indicating that the region is at capacity for application connector deployment and the application connector thus cannot be deployed. The notification may be displayed on a graphical user interface (GUI) (e.g., a GUI being used by a network administrator for managing and configuring application/application connector deployment).

At block 511, the configuration manager deploys a new network element. Deployment of the network element can be based on communication with a service provider of the cloud environment to which the region corresponds (e.g., via an API of the CSP) to instantiate/deploy a new resource. As another example, deployment of the network element can be based on communicating an instruction/command to a network element that can serve the region based on proximity to bring the network element online.

At block 513, the configuration manager orchestrates connection of the new application connector to each network element that serves the region. The application connector establishes tunneled connections with each network element that serves the region. The configuration manager can communicate an instruction/command to the newly deployed application connector to create a tunnel to each network element that serves the region. The instruction/command can identify the network element(s) with which a connection should be established. Once deployed and connected to the network element(s), the application connector can then continue with application discovery and route advertisement as described above in reference to FIG. 4.

At block 515, the configuration manager orchestrates establishment of full mesh connectivity among network elements. The newly deployed network element establishes tunneled connections to each network element of the network fabric that connects to application connectors. The configuration manager can communicate an instruction/command to the newly deployed network element to create a tunnel to other network elements of the network fabric. The instruction/command can identify the other network element(s) with which a connection should be established.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
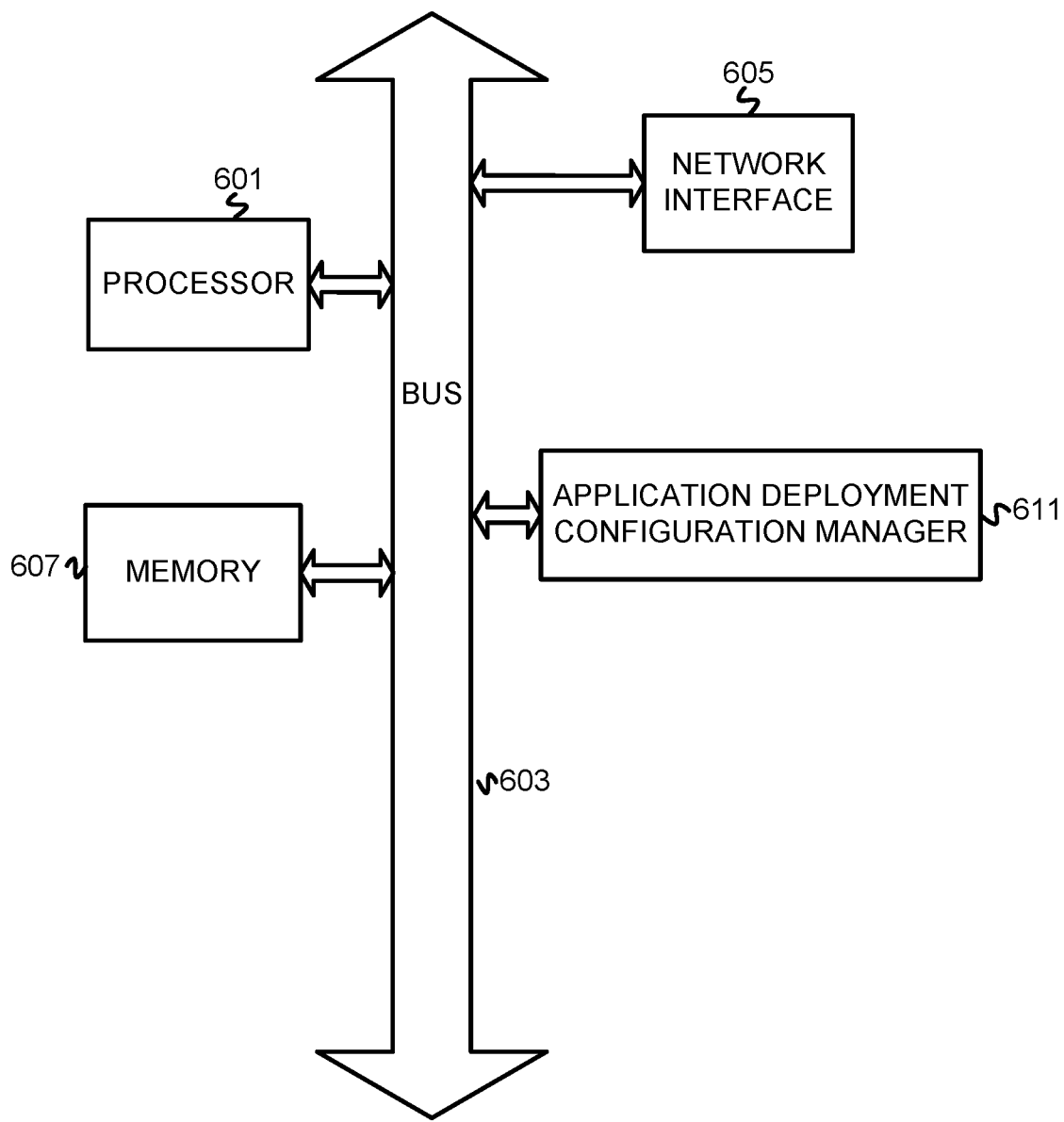
FIG. 6 depicts an example computer system with an application deployment configuration manager.

FIG. 6 depicts an example computer system with an application deployment configuration manager. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes application deployment configuration manager 611. The application deployment configuration manager 611 configures reachability of deployed applications of a tenant via anycast routing. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising:
configuring reachability of one or more instances of a first application in a network via anycast routing based on indication of deployment of the one or more instances of the first application in the network, wherein configuring reachability of the one or more instances of the first application in the network via anycast routing comprises:
allocating an anycast Internet Protocol (IP) address for a name of the first application and a port number and protocol associated with the first application, wherein the anycast IP address is shared across the one or more instances of the first application that share the name, port number, and protocol; and
setting a domain name system (DNS) entry to resolve the name of the first application to an IP address of the first application;
configuring a first destination network address translation (NAT) rule to translate the IP address of the first application to the anycast IP address; and
configuring a second destination NAT rule to translate the anycast IP address to a private IP address of a particular instance of the first application based on detected network traffic matching to the anycast IP address, the port number, and the protocol, wherein the second destination NAT rule also indicates the port number and the protocol.

2. The method of claim 1, further comprising load balancing network traffic of the first application that indicates the anycast IP address as a destination address across the one or more instances of the first application.

3. The method of claim 2, wherein load balancing the network traffic of the first application is based on equal-cost multi-path routing.

4. The method of claim 1, further comprising advertising reachability of the first application via the anycast IP address to one or more network elements.

5. The method of claim 4, wherein advertising reachability of the first application comprises advertising a route to the anycast IP address to the one or more network elements in accordance with the Border Gateway Protocol (BGP).

6. The method of claim 1, wherein allocating the anycast IP address to the first application comprises allocating the anycast IP address from a network address aggregate of routable address space of the network, wherein the network address aggregate was allocated to a proxy of the first application.

7. The method of claim 1, wherein the name of the first application is a fully qualified domain name of the first application.

8. The method of claim 1, wherein the IP address of the first application is a virtual IP address allocated to the first application from routable address space of the network.

9. The method of claim 8, further comprising allocating the virtual IP address from the routable address space of the network for the name of the first application.

10. A non-transitory machine-readable medium having program code stored thereon, the program code comprising instructions to:
   assign, based on detecting deployment of an application with a first application name in a network, an anycast address to application instances associated with a first application name and a port number and protocol of the application;
   configure network address translation (NAT) rules to route network traffic of the application via anycast routing, wherein the instructions to configure the NAT rules comprise instructions to, for each instance of the application having a corresponding private network address:
      configure a first destination NAT rule to translate a network address of the application to the anycast address; and
      configure a second destination NAT rule to translate the anycast address to the corresponding private network address of a particular instance of the application based on detected network traffic matching to the anycast address, the port number, and the protocol, wherein the second destination NAT rule also indicates the port number and the protocol; and
   route, based on detecting network traffic indicating the first application name, the network traffic to the application via anycast routing according to the first and second destination NAT rules.

11. The non-transitory machine-readable medium of claim 10, wherein the instructions to route the network traffic to the application comprise instructions to load balance the network traffic across the application instances.

12. The non-transitory machine-readable medium of claim 10, wherein the first application name is a fully qualified domain name (FQDN), wherein the instructions to assign the anycast address to the application instances associated with the first application name comprise instructions to assign the anycast address to application instances associated with the FQDN and the port number and the protocol of the application.

13. The non-transitory machine-readable medium of claim 10, wherein the instructions to assign the anycast address to application instances associated with the first application name and the port number and the protocol comprise instructions to assign the anycast address from a network address aggregate of routable address space of the network, wherein the network address aggregate was allocated to a proxy of the application.

14. The non-transitory machine-readable medium of claim 10, wherein the program code further comprises instructions to advertise reachability of the application via the anycast address to one or more network elements, wherein the instructions to advertise reachability of the application comprise instructions to advertise a route to the anycast address to the one or more network elements in accordance with the Border Gateway Protocol (BGP).

15. A system comprising:
   one or more network elements deployed across one or more networks of a tenant, wherein the one or more network elements front a corresponding one or more instances of an application; and
   a network controller that communicates with the one or more network elements, wherein the network controller comprises a processor and a machine-readable medium having instructions stored thereon that are executable by the processor to cause the network controller to:
      configure reachability of a first application via anycast routing based on detecting deployment of the first application, wherein the instructions to configure reachability of the first application via anycast routing comprise instructions to:
         allocate an anycast Internet Protocol (IP) address for a name of the first application and a port number and protocol associated with the first application;
         for each of the instances of the first application:
            set a domain name system (DNS) entry to resolve the name of the first application to a virtual IP address assigned to a particular instance of the application;
            configure a first destination network address translation (NAT) rule to translate the virtual IP address to the anycast IP address; and
            configure a second destination NAT rule to translate the anycast IP address to a private IP address of the particular instance of the first application based on detected network traffic matching to the anycast IP address, the port number, and the protocol, wherein the second destination NAT rule also indicates the port number and the protocol.

16. The system of claim 15, further comprising instructions executable by the processor to cause the network controller to configure a load balancing rule to load balance network traffic destined for the first application across the one or more network elements that front the corresponding one or more instances of the first application.

17. The system of claim 15, wherein the name of the first application is a fully qualified domain name (FQDN), wherein the instructions executable by the processor to cause the network controller to detect deployment of the first application comprise instructions executable by the processor to cause the network controller to detect deployment of application instances associated with the FQDN, the port number, and the protocol.

18. The system of claim 17, wherein the instructions executable by the processor to cause the network controller to allocate the anycast IP address for the name of the first application, the port number, and the protocol comprise instructions executable by the processor to cause the network controller to allocate the anycast IP address for the FQDN, the port number, and the protocol.

19. The system of claim 15, wherein each particular network element of the one or more network elements comprises a particular processor and a particular machine-readable medium having instructions stored thereon that are executable by the particular processor to cause the particular network element to advertise, based on detecting availability of the corresponding one of the one or more instances of the first application, to one or more neighboring network elements, a route to the anycast IP address via Border Gateway Protocol (BGP) route advertisement.

20. The system of claim 15, further comprising instructions executable by the processor to cause the network controller to allocate one or more network address aggregates of routable address space of the one or more networks to the one or more network elements, wherein the instructions executable by the processor to cause the network controller to allocate the anycast IP address to the first application comprise instructions executable by the processor to cause the network controller to allocate the anycast IP address from one of the one or more network address aggregates.

\* \* \* \* \*